US006483107B1

(12) United States Patent
Rabinovitz et al.

(10) Patent No.: US 6,483,107 B1
(45) Date of Patent: Nov. 19, 2002

(54) CANISTER HAVING A COMBINED GUIDE RAIL AND LIGHT PIPE SYSTEM FOR USE IN A COMPUTER PERIPHERAL ENCLOSURE

(75) Inventors: Josef Rabinovitz, 20400 Plummer St., Chatsworth, CA (US) 91311; Eli Danino, Northridge; Richard Fisk, Granada Hills, both of CA (US)

(73) Assignee: Josef Rabinovitz, Chatsworth, CA (US)

( * ) Notice: Subject to any disclaimer, the term of this patent is extended or adjusted under 35 U.S.C. 154(b) by 0 days.

(21) Appl. No.: 09/310,036

(22) Filed: May 11, 1999

(51) Int. Cl.[7] .................................................. H01J 5/02
(52) U.S. Cl. ...................................... 250/239; 361/683
(58) Field of Search ................................. 250/239, 216; 52/36.2, 36.5, 79.2; 361/683–685, 725–727

(56) References Cited

U.S. PATENT DOCUMENTS 5,112,119 A * 5/1992 Cooke et al. ............... 312/283
6,018,456 A * 1/2000 Young et al. ............... 361/684

* cited by examiner

Primary Examiner—Que T. Le
(74) Attorney, Agent, or Firm—W. Edward Johansen

(57) ABSTRACT

A casing of a computer peripheral enclosure. The casing has at least one compartment. Each compartment is rectangular and has a cross-sectional area and a depth. Each compartment also has two guide rail guides. A canister for use with a storage device includes a u-shaped tray which is rectangular and has a cross-sectional area and a depth. The canister has two guide rails. The cross-sectional area and the depth of the canister are slightly less than the cross-sectional area and the depth of each compartment. The u-shaped tray also has two side walls and a two return lips so that the u-shaped tray is able to slide freely, but snugly, into the compartment of the casing. Each guide rail is mechanically coupled to one of the side walls of the u-shaped tray walls. The guide rails of each u-shaped tray slides freely, but snugly, into one of the compartments on the guide rail guides thereof.

13 Claims, 12 Drawing Sheets

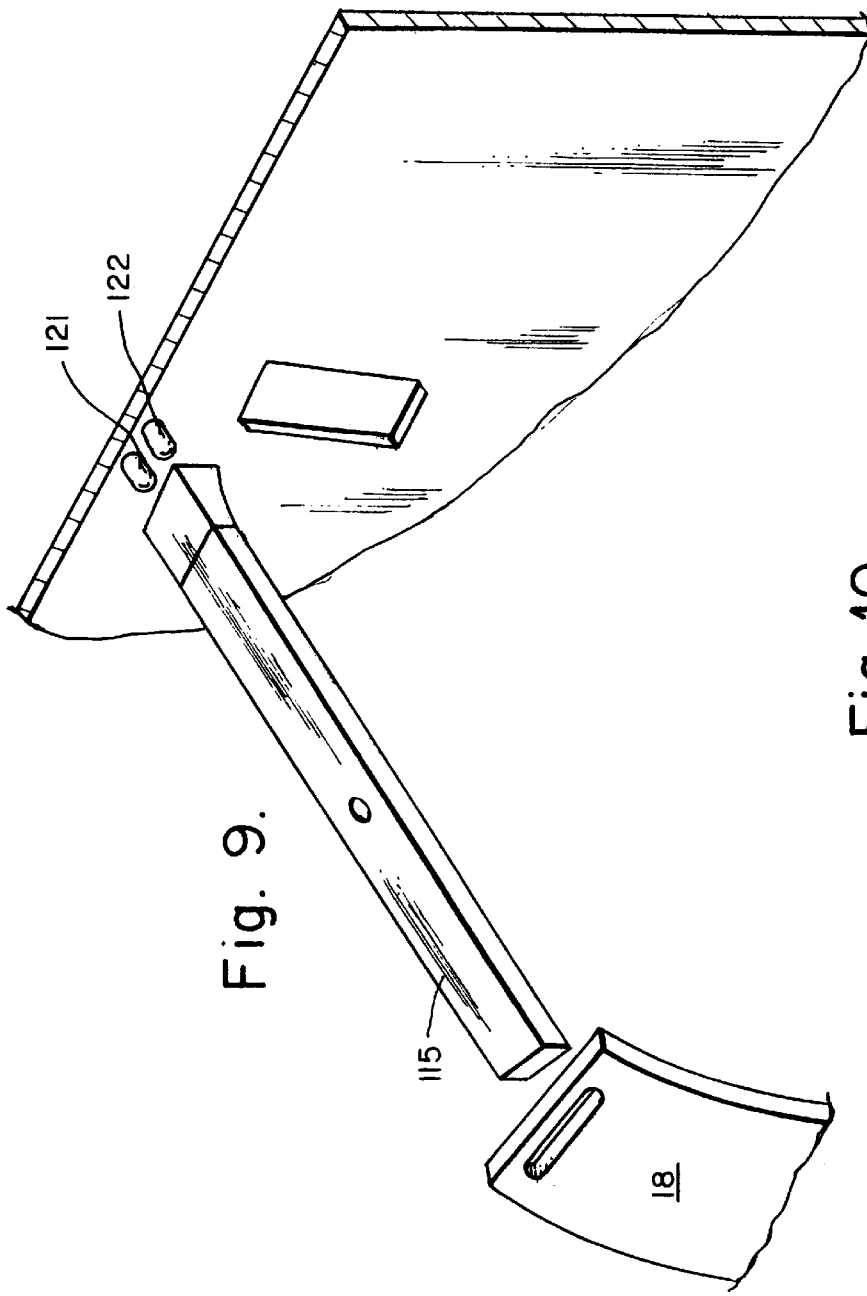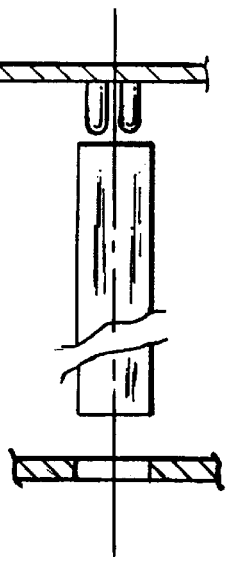

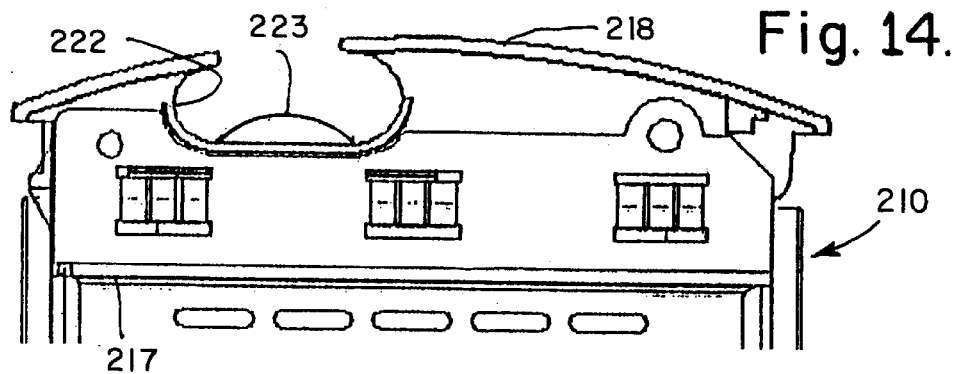
Fig. 14.
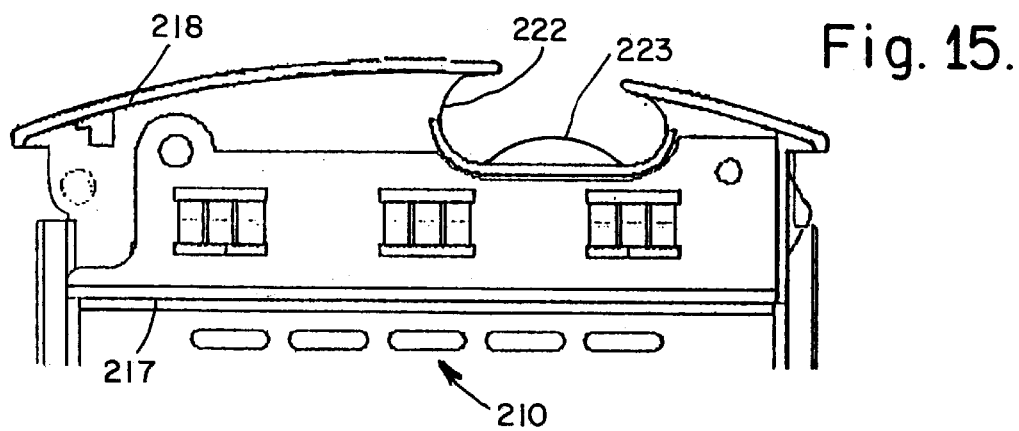
Fig. 15.
Fig. 16.
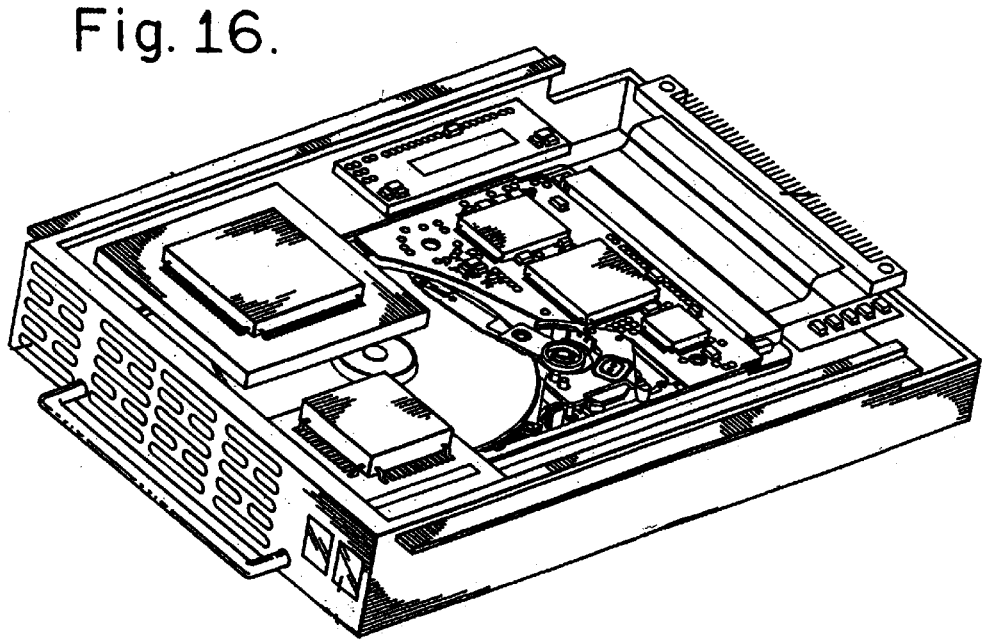

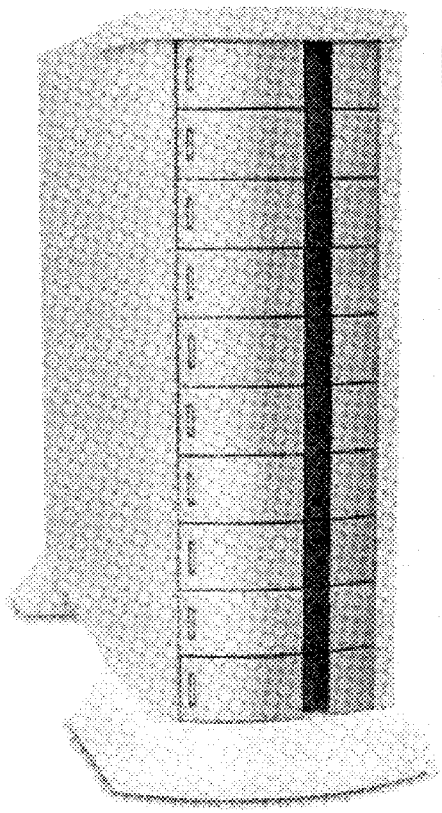
Fig. 21.
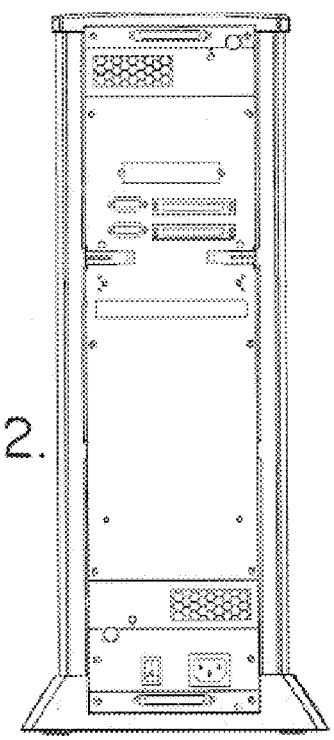
Fig. 22.
Fig. 23.
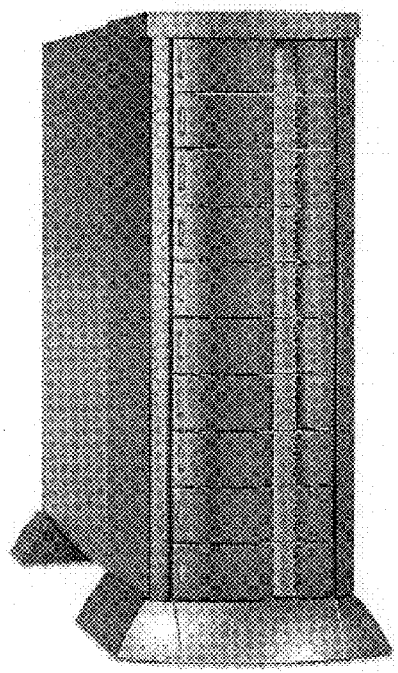
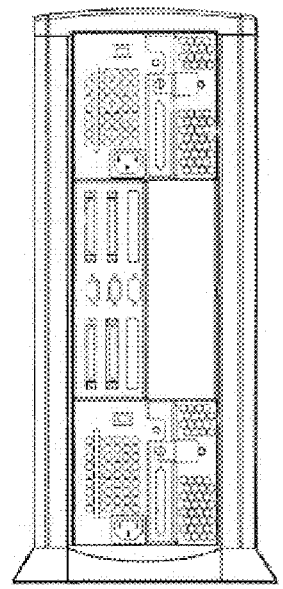
Fig. 24.

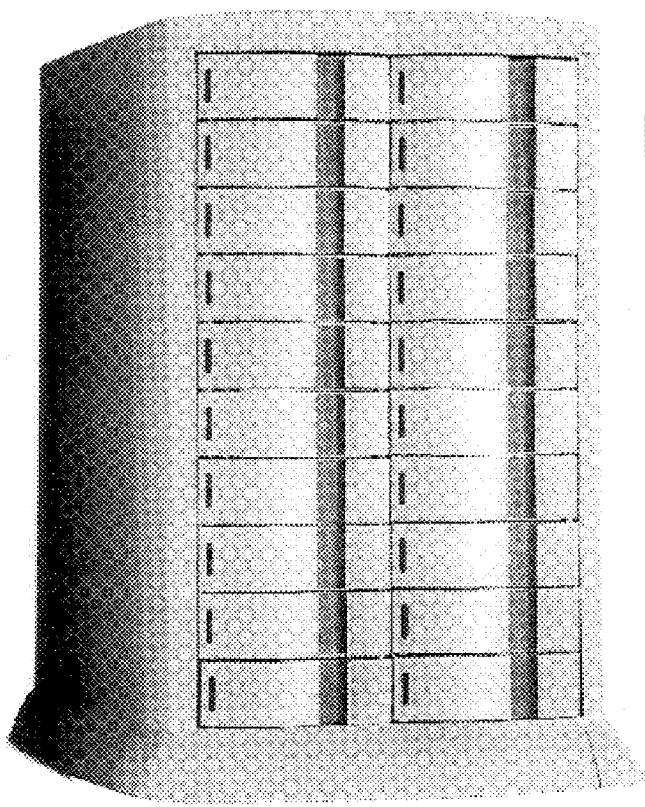
Fig. 25.
Fig. 26.
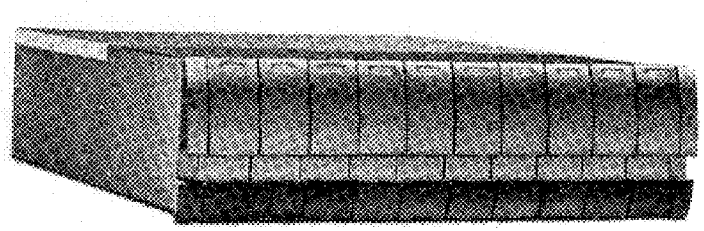
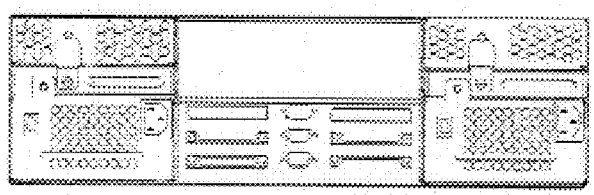
Fig. 27.

CANISTER HAVING A COMBINED GUIDE RAIL AND LIGHT PIPE SYSTEM FOR USE IN A COMPUTER PERIPHERAL ENCLOSURE

BACKGROUND OF THE INVENTION

The field of the invention is computer peripheral enclosures and more particularly a canister having a combined guide rail and light pipe system for use in computer peripheral enclosures.

U.S. Pat. No. 5,822,184 teaches a modular data device assembly for a computer is disclosed, wherein the assembly has a housing that is designed to fit into a conventional, industry standard size expansion bay. Individual plug-in data storage devices, such as hard disk drive and CD-ROM drives, are disposed vertically in a stacked formation within the housing. A motherboard with plug-in connectors to which the drives are connected allows easy replacement of defective data devices, which devices slide in or out. The disk drives and modular data device assemblies may be arrayed in either series or in parallel to a controller. By its modular structure and redundant storage functions, the device benefits from what is known as Redundant Array of Inexpensive Disk principle.

U.S. Pat. No. 5,797,667 teaches a hard disk drive mount which includes a stop bar at either side of a front end of a hard disk drive frame. The stop bars prevent a pull handle on a case of the hard disk drive frame from being forcefully pulled up thereby protecting the hard disk drive lock. The relative movement between the pull handle and the stop bar may result in a counter force between the case and a mount to cause two connecting ports to be separated to permit smooth removal of the hard disk drive.

U.S. Pat. No. 5,828,548 teaches a removable hard disk drive mount which includes structures at the end of a rack which cooperate with structures on the shaft of a pivotal handle to ensure that final insertion of the hard disk drive casing into the rack is carried out in an even manner without excessive force. The mount includes two notches which are disposed at the end of a pivotal shaft of a handle for the casing and corresponding angles and bent portions of the rack which permit final insertion of the hard disk drive casing into the rack only when the handle is turned from a horizontal to a vertical position.

U.S. Pat. No. 5,886,869 teaches a sleeve which holds a hard disk drive in portable removable engagement with a computer. The sleeve includes a base and a cover attachable to the base by mechanism of threaded fasteners. The base includes plural holder arms. When the cover is removed from the base and the hard disk drive advanced into the base, the holder arms move outwardly as the hard drive rides on the arms. When the hard disk drive clears the arms, the arms, which are biased to a hold configuration, move back inwardly to hold the hard disk drive in the base, with the cover then attached to the base. The edge of the cover cooperates with the base to hold the holder arms in the hold configuration and thereby securely hold the hard disk drive in the sleeve.

U.S. Pat. No. 5,741,055 teaches a hard disk drive converting drawer which includes a drawer and a fixing seat. A pull handle is back and forth slidably disposed at the front end of bottom side of the drawer. A transverse beam is disposed between two balance levers of the pull handle for back and forth pulling an auxiliary lever to press and close/open a touch switch. When the touch switch is pressed and closed, the auxiliary lever is forced by a leaf spring disposed on one side to retract the pull handle to a hidden position. When the touch switch is bounded open, the pull handle is pushed and ejected for a user to easily pull out the pull handle. When pulling the pull handle, the auxiliary lever is driven to push a stopper block projecting from one side of the fixing seat so as to smoothly draw out the drawer from the fixing seat for taking out the hard disk drive.

U.S. Pat. No. 5,808,871 teaches a modular tower which has a plurality of bays which are fitted with rails upon which individual trays slide. The trays are detailed to carry electronic components. Each tray is fitted with electrical connectors which are connected to corresponding electrical connectors on a backplane in the tower. The tower can be employed vertically and horizontally. The tower has easily removable top and side panels and has a two component base that may be adjustably secured to one or more of the towers. The front thereof is fitted with a removable frame which carries a hinged door. The frame can be removed and rotated 180 degrees in order to change the swing of the door from left to right and vice-versa.

U.S. Pat. No. D403,945 teaches an ornamental design for a connector unit.

U.S. Pat. No. 5,788,347 teaches a system which interlocks various computer peripheral enclosures to prevent them from falling off of either desk tops or each other, to compactly organize them to save space and prevent disconnection or tangling of their connecting wires, to more easily and securely move them from one location to another and to provide an attractive interlocking arrangement. L-shaped brackets are secured to the enclosures or housings, preferably at the enclosure bases, and extending up their sides. Interlocking devices have snap-in members at each end thereof. One member snaps into an opening in a bracket of one enclosure unit and another member snaps into an opening in a bracket of another enclosure unit thereby the two units are securely held together in a side-by-side or one-on-top-of-the-other arrangement. Insertion of a narrow tool into an opening in the bracket allows for either easy unsnapping or disconnect. Optional carrying handle, cable manager and angled foot support are provided for releasable snap fit attachment to the brackets. The device relates primarily to systems for interlocking computer peripheral modules together in various horizontal and/or vertical stacking arrangements. Computer systems today, both in the home and office, typically include numerous storage or other peripheral devices, such as CD ROMs, floppy disks, magnetic optical disk drives and tape back-up systems, to be connected by wires or otherwise operated in conjunction with a computer. It is important to organize and arrange these devices to be in efficient close proximity to one another, to minimize the horizontal as well as vertical space which they occupy and to connect them together in the desired arrangement securely to prevent them from falling off of one another and/or off of desk or table tops. Unfortunately, the interlocking systems of the prior art do not provide for easy flexible use, easy unlocking and unlocking and an attractive appearance. Directed to remedying the problems in the prior art, an interlocking system is adapted for either interconnecting or mechanically locking together computer peripheral enclosures, is herein provided. The system includes four L-shaped brackets which are connected to the bottom of a first enclosure or modular unit. Two of them extend with their back portions up one side of the unit and the other two up the other side. The feet of the brackets are screwed to the bottom surfaces of the units. Four similar brackets are similarly attached to a second unit. A first interlocking device is snap fit at one end to one of the back portions of the first unit and the opposite end to one of the back portions of the second unit. A similar second interlocking device is snap fit into the corresponding back portions parallel thereto of the two units. And thereby the first and second units are securely held together in side-by-side or one on top of the other arrangements. Inserting narrow tools into openings in the brackets releases the snap fit interlock as desired, to disconnect the units. Instead of locking two units together, the interlocking devices can be configured and connected together as a carrying handle for one of the units, as a cable handler for the unit, or as an angled base for the unit. Different external surface configurations of the back portions, the body portions of the interlocking devices, the top trim caps and the bottom foot pads allow for various attractive system designs, and also to enclose them to prevent dust or dirt from collecting therein.

U.S. Pat. No. 5,067,041 teaches a shielding strip for a computer which includes an electrically conductive housing and a non-conductive drive mounting structure situated within the housing. The drive mounting structure includes a plurality of bays which communicate with an opening in the housing. An electrically conductive retainer is situated over the opening to hold the disk drives in the bays. The shielding strip includes a longitudinal main portion extending along a first side of the housing adjacent the opening and situated between the first side of the housing and the drive mounting structure. The shielding strip also includes a plurality of spring structures extending laterally away from the main portion and toward the bays. Each spring structure includes a first spring portion for contacting a conductive portion of a disk drive mounted in a respective bay and a second spring portion for contacting the retainer.

U.S. Pat. No. 5,224,019 teaches a modular computer chassis which includes a main chassis. A motherboard is attached to the main chassis and a subchassis attachable to the main chassis. The subchassis is capable of having at least one computer component attached thereto such that the computer component is electrically connected to the motherboard. The computer component is thus separable from the main chassis by removing the subchassis from the main chassis. The subchassis contains those computer components subject to mechanical wear and most often requiring replacement, such as the power supply and hard disk drives. The subchassis is mechanically connected to the main chassis by using slots and tabs such that when the cover is in place upon the computer, then the subchassis is secured therein. The subchassis and the computer components disposed thereon thus form a module which is conveniently removable and replaceable such that those computer components most frequently requiring service is quickly removed and replaced by a person unskilled in computer repair.

U.S. Pat. No. 5,420,750 teaches computer apparatus with modular disk drive memory packages which is adapted to be either used or replaced in a common memory stage. Each module is to be either inserted or renewed in a compartment thereof.

U.S. Pat. No. 4,754,397 teaches a fault tolerant computing facility which includes a housing array for containing a plurality of hardware element modules such as disk drives, a plurality of modularized power supplies and plural power distribution modules, each being connected to a separate source of primary facility power. Each module is self aligning and blind-mateable with the housing and may be installed and removed without tools, without disturbing the electrical cabling within the cabinet, and automatically by a maintenance robot. The logical identity of each module is established by programming at a control panel and by corresponding physical location of installation of each module within the housing array.

U.S. Pat. No. D387,969 teaches an ornamental design for a connector.

U.S. Pat. No. 5,227,954 teaches a mounting arrangement which allows drives of different sizes to be mounted in a drive dock and the hardware device necessary to mount full height, half height or third height drives in a conventional size drive dock. The hardware device provides mounting plates which have upper and lower ridges for mounting a single disk drive of varying size within the single drive dock.

U.S. Pat. No. 5,222,897 teaches a circuit board inserter/ejector system which is for inserting a circuit board into a back plane in a chassis and for ejecting the circuit board from the back plane of the chassis. The inserter/ejector system can be used with a magnetic disk drive to facilitate insertion and removal thereof within a computer.

U.S. Pat. No. 5,309,323 teaches a removable electrical unit with combined grip and release mechanism which is mountable into a corresponding device bay in front of the subsystem chassis, wherein each removable disk drive incorporates a soft stop and release mechanism.

U.S. Pat. No. 5,224,020 teaches a modular electrical apparatus which includes a plurality of customer removable electrical devices such as disk drives. The devices and support units are all blind pluggable into a removable central electrical distribution unit.

U.S. Pat. No. 5,006,959 teaches a computer apparatus with modular components including segregated functional units like a disk array, various plug-in card packages, power/fan unit, and a motherboard. Another goal for moving towards modular computer components is to improve reliability. One concept in the field of disk drives is known as Redundant Array of Inexpensive Disk (RAID). A number of disk drives are interconnected in an array for redundant storage of data. Failure of one disk drive does not destroy irreplaceable data.

U.S. Pat. No. 5,119,497 teaches a computer which has modular components and is adapted to be used/replaced on a common base mount. The computer also has a motherboard with some number N of connect-receptacles thereon, a deck superposed to form a plenum above the motherboard and characterized by N like aperture sets, a connector-slot in registry with each connect-receptacle, several like removable, circuit-modules each including a connector adapted to fit through any of the connector-slots to be connected with an associated receptacle and an air cool arrangement arranged to draw cooling-air into the circuit-modules and then down upon and across the motherboard coolingly.

U.S. Pat. No. 5,889,469 teaches an alarm circuit which uses speed detection so that at a fan slowdown speed below a critical low level, a buzzer alarm starts sounding at a low warning volume and then as the fan slows down further the volume increases. Either the buzzer volume or the buzzing frequency is inversely proportional to the fan speed. The circuit advantageously can be used for a wide range of fans. A pulse detector of a first stage comparator of this circuit detects the pulses or speed of the fan. More particularly, a power supply isolation resistor with an AC coupling capacitor block the DC voltage levels at the fan so that only the AC or pulse component of the fan is picked up. The isolation resistor prevents the power source from attenuating the pulses. The second stage comparator of the circuit sets the fan speed at which the alarm is to start buzzing and powers the buzzer accordingly. The pulses are amplified by the first stage comparator and they periodically discharge a charging capacitor. If the pulses are too infrequent, the capacitor will charge up to the level of an error comparator which will trip and sound a buzzer. Since the circuit uses only discrete components and one QUAD comparator for all signal processing including alarm activation, it is inexpensive. It is also very small allowing for greater mounting flexibility. Many of the prior fan alarm circuit designs attempted to differentiate between running current of the fan and "not running" current. This difference is very small when compared with the difference in either current for different sized fans. A different alarm circuit was required for each size of fan and for fans with different bearings such as sleeve or ball bearing. Additionally, the inherent motor noise pulses required special filtering, because these motor pulses invariably were greater than the difference in running versus none running current. However, using different circuitry is very expensive and requires complicated tracking and logistics to ensure that the proper alarm circuit is installed. U.S. Pat. Nos. 4,479,115, 4,843,378, 4,977,375, 5,115,225, 5,436,827, 5,517,175, 5,534,854 and 5,574,667 teach fans and temperature sensors. The disclosures of each of these patents are hereby incorporated by references. Many of the alerting systems have numerous components resulting in high costs and large units. Since the units are large, the locations where they can be mounted are limited. One common use for the fans is to cool hard disk drives in computer systems. To efficiently handle larger amounts of data storage, larger hard drives have been and are being developed. These drives turn faster, generating larger amounts of heat. If the cooling fan for that drive slows down too much or otherwise fails, the drives can be damaged if they are not quickly shut-off or the fans quickly replaced. The drives may not spin, errors in data may result and/or they may not acknowledge requests for information. It is even more critical in today's environment that there be a reliable indication of fan slowdown or failure so that corrective action can be quickly taken to prevent the problems discussed above. Early detection allows corrective action to be taken before the drives are shut down to prevent or minimize loss of data in progress or other problems caused to open files.

U.S. Pat. No. 5,844,776 teaches a static memory device has compatibility with a disk drive installed in an electronic apparatus as an external storage unit. The static memory device has a first memory board arranged on the same base portion as the one on which the disk drive can be installed, the first memory board having the same projected area as the disk drive. On the first memory board is arranged a storage unit which is accessible at high speed, such as a semiconductor memory. When the storage capacity of the first memory board only is not enough, an extension memory board can be mounted on the first memory board. When the storage capacity is not sufficient even by mounting the extension memory board on the first memory board, a second memory board can be mounted on the extension memory board. Extension memory boards can also be mounted on the second memory board. Even in this state, the shape is the same as that of the disk drive. Therefore, the user is allowed to select either the disk drive or the static memory device and to mount it in the electronic apparatus as an external storage unit.

U.S. Pat. No. 5,852,546 teaches a computer in which a hard disk drive is mounted in the computer chassis. An actuation assembly is provided for actuating the hard disk drive and includes an arm which engages and actuates the eject button of the disk drive upon movement of the actuation assembly and the arm in a first direction. A button is provided in the cover for the chassis which, when manually pressed, engages the actuation assembly causing movement of the actuation assembly and the arm in the first direction to actuate the eject button. The arm is configured to engage and actuate eject buttons having different sizes and/or at different locations.

U.S. Pat. No. 5,602,696 teaches a computer system providing for quick removal and quick and simple installation of a disk drive into the system. A latching and positioning arrangement provides releasable support for the disk drive unit and achieves automatic electric connections with the installation of the disk drive unit in the computer system. This apparatus permits quick removal of hard disk drive units from a receiving unit of a host computer system. The apparatus also provides quick, simple installation of the hard disk drive units into the computer system. It is often desirable to incorporate several hard disk drives into the computer system. Many applications permit the hard disk drive to be either removed or interchanged for reasons of data security, backup purposes or for expanding a system. While this is a desirable feature, previous systems have required the computer operator to manually remove a number of connecting cables and to unscrew two thumb nuts to release the disk drive unit from its mounting in the host computer system. An occasional misalignment of ribbon cable connectors occurred during installation of the disk drive unit improperly connecting either a drive unit and or damaged pins on the disk drive controller. Extended cable lengths used in these systems could result in some data validity problems. The device relates to a disk drive information storage system wherein one or more disk drive carrier modules are detachably coupled with a receiving unit. The drive information storage system includes a receiving unit having an electrical connector fitting secured thereon for the transmission of control and data signals, a disk drive carrier module for detachable coupling with the receiving unit, and having an electrical connector secured in fixed relation therewith for mating with the electrical connector fitting of the receiving unit, the receiving unit and the disk drive carrier module having cooperating positioning mechanism automatically operable to position the carrier module in a final assembled position in relation to the receiving unit with the electric connector of the carrier module in mating relation to the electrical connector fitting of the receiving unit. The device provides a disk drive information storage system of the foregoing type, with the carrier module having a carrier handle disposed for convenient carrying of the carrier module. The cooperating positioning mechanism provides for interengagement of the carrier module with the receiving unit solely by manipulation of the carrier module and thereafter automatically guiding the carrier module into the final assembled position as manual insertion force is applied to the carrier handle. The device provides in a disk drive information storage system, a receiving unit for the transmission of signals for the control of a disk drive, and a disk drive carrier module containing a disk drive and constructed for detachable coupling with the receiving unit to form a disk drive system, the receiving unit having a receptacle arranged to receive the carrier module and having carrier module guide mechanism for guiding the carrier module during its insertion into the receptacle along an insertion path, the receiving unit and the carrier module having cooperating electrical connectors which are interconnected by movement toward each and the guide mechanism constraining the carrier module such that the cooperating electric connectors automatically interconnect with each other as the carrier module is inserted into the receptacle. The device also provides in a disk drive information storage system, a receiving unit for the transmission of signals for the control of a disk drive, and a disk drive carrier module for containing a disk drive, and for detachable coupling with the receiving unit to form a complete disk drive system, the carrier module having first and second mounting lug mechanism for effecting an interengagement of the carrier module with the receiving unit, the receiving unit having first retainer mechanism for receiving the first lug mechanism with the carrier module in a tilted orientation while accommodating a pivotable movement of the carrier module about the first retaining mechanism toward a fully assembled position, and second latching type retainer mechanism aligned with the second lug mechanism in the tilted orientation of the carrier module such that the second lug mechanism are automatically latched by the second retainer mechanism as the carrier module is pivoted about the first retainer mechanism into the fully assembled position, the lug mechanism and the retainer mechanism being automatically operable to secure the carrier module in the fully assembled position solely by manipulation of the data module. The device provides an information storage system which includes a disk drive carrier module of a size to receive any of a plurality of hard disk drives having respective different mounting hole requirements. The disk drive carrier module has a mounting mechanism therein with patterns of mounting holes which selectively mounts any one of the plurality of hard disk drives. The disk drive carrier module is quick and simple to remove from a host computer system and can be quickly and accurately reinstalled in the system. A quick release arrangement for the disk drive module eliminates all manual insertions or extractions or connecting cables and automatically insures accurate positioning of the electrical connectors during final assembly of the disk drive module into the host computer system. This automatic positioning arrangement provides support for two disk drive carrier modules. Each module includes a carrier assembly to which a disk drive unit is mounted. The carrier assembly has an electrical connector member secured therewith and aligned with respect to a path of movement of the carrier module into its final installed operating position in the host computer system. Ribbon cables interconnect the disk drive unit with the electrical connector. Each carrier module is mounted in the computer system in operative relation to a receiving unit having an interconnect board. The interconnect board serves to accurately support an electrical connector fitting which is connected to various computer system components in order to establish the desired power, data and control signal transmission paths as required. Each of the receiving units includes a guide mechanism which constrains the disk drive carrier module during its final movement into operating position such that the electrical connectors are automatically aligned and interconnected.

U.S. Pat. No. 4,633,350 teaches a computer system which provides for quick removal and quick and simple installation of a disk drive unit into the system. A latching and positioning arrangement provides releasable support for the disk drive unit and achieves automatic electrical connections with the installation of the disk drive unit in the computer system.

U.S. Pat. No. 5,741,055 teaches a hard disk drive converting drawer which includes a drawer and a fixing seat. A pull handle is back and forth slidably disposed at the front end of bottom side of the drawer. A transverse beam is disposed between two balance levers of the pull handle for back and forth pulling an auxiliary lever to press and close/open a touch switch. When the touch switch is pressed and closed, the auxiliary lever is forced by a leaf spring disposed on one side to retract the pull handle to a hidden position. When the touch switch is bounded open, the pull handle is pushed and ejected for a user to easily pull out the pull handle. When pulling the pull handle, the auxiliary lever is driven to push a stopper block projecting from one side of the fixing seat so as to smoothly draw out the drawer from the fixing seat for taking out the hard disk drive.

U.S. Pat. No. 5,327,308 teaches a computer system which provides for quick removal and quick and simple installation of a disk drive unit into the system. A latching and positioning arrangement provides releasable support for the disk drive unit and achieves automatic electric connections with the installation of the disk drive unit in the computer system. This apparatus permits quick removal of high capacity disk drive units from a receiving unit of a host computer system. The apparatus provides quick, simple installation of the disk drive units into the computer system. In order to provide greater flexibility in the operation of a computer system it is often desirable to incorporate several disk drive units into the system. Many applications permit the disk drive unit to be removed or interchanged for reasons of data security, backup purposes or for expanding a system. While this is a desirable feature, previous systems have required the computer operator to manually remove a number of connecting cables and to unscrew two thumb nuts to release the disk drive unit from its mounting in the host computer system. Also in previous designs an occasional misalignment of ribbon cable connectors during installation of the hard disk drive improperly connected the hard disk drive and or damaged pins on the disk drive controller. Further, extended cable lengths used in these systems could result in some data validity problems. In a hard disk drive information storage system one or more hard disk drive carrier modules are detachably coupled with a receiving unit. The hard disk drive information storage system includes a receiving unit having an electrical connector fitting secured thereon for the transmission of control and data signals, a disk drive carrier module for detachable coupling with the receiving unit and having an electrical connector secured in fixed relation therewith for mating with the electrical connector fitting of the receiving unit, the receiving unit and the disk drive carrier module having cooperating positioning mechanism automatically operable to position the carrier module in a final assembled position in relation to the receiving unit with the electric connector of the carrier module in mating relation to the electrical connector fitting of the receiving unit. The disk drive information storage system has a carrier module having a carrier handle disposed for convenient carrying of the carrier module, and the cooperating positioning mechanism providing for interengagement of the carrier module with the receiving unit solely by manipulation of the carrier module, and thereafter automatically guiding the carrier module into the final assembled position as manual insertion force is applied to the carrier handle.

U.S. Pat. No. 5,563,748 teaches a computer system which provides for quick removal and quick and simple installation of a hard disk drive unit into the system. A latching and positioning arrangement provides releasable support for the hard disk drive unit and achieves automatic electric connections with the installation of the disk drive unit in the computer system.

U.S. Pat. No. 4,633,350 teaches a computer system which provides for quick removal and quick and simple installation of a disk drive unit into the system. A latching and positioning arrangement provides releasable support for the disk drive unit and achieves automatic electrical connections with the installation of the disk drive unit in the computer system.

U.S. Pat. No. 5,682,277 teaches a method which inserts and extracts a data storage device in a computer storage system which includes the step of providing a self-contained portable disk drive module including a complete hard disk drive and conductors which extend from the hard disk drive for carrying power, control and data signals necessary for operation of the hard disk drive. A carrier for receiving and secured with, the complete hard disk drive to form a self-contained portable disk drive module, as well as a plurality of carrier connection contacts electrically connected to the first plurality of conductors are provided. The method also includes the step of providing a receiving unit having guide members and a plurality of receiving unit connection contacts. The guide members facilitate alignment between the carrier connection contacts and the receiving unit connection contacts as the disk drive module engages the receiving unit. A further step of the method includes urging the disk drive module into engagement with the receiving unit and into a final assembled position in which all power, control and data signals necessary for operation of the complete hard disk drive are established without manual manipulation of any connecting cables. Additional method steps include removing power to the hard disk drive unit module, allowing the complete hard disk drive to spin down after removing the power and extracting the hard disk drive module from the final assembled position after spin down. The self-contained portable disk drive module is extracted without the need for manual manipulation of any connecting cables.

U.S. Pat. No. 5,517,373 teaches a computer system which provides for quick removal and quick and simple installation of a disk drive unit into the system. A latching and positioning arrangement provides releasable support for the disk drive unit and achieves automatic electric connections with the installation of the disk drive unit in the computer system.

U.S. Pat. No. 5,515,215 teaches a computer system which provides for quick removal and quick and simple installation of a disk drive unit into the system. A latching and positioning arrangement provides releasable support for the disk drive unit and achieves automatic electric connections with the installation of the disk drive unit in the computer system.

U.S. Pat. No. 5,122,914 teaches a computer system which provides for quick removal and quick and simple installation of a hard disk drive into the system. A latching and positioning arrangement provides releasable support for the hard disk drive and achieves automatic electric connections with the installation of the disk drive unit in the computer system.

U.S. Pat. No. 5,119,270 teaches a multimedia data storage system which includes a compartmentalized drawer which can be tailored to accommodate the differing cooling requirements of different device types thus allowing each device type to be mounted in any device position. A cover in the form of a frame having a plurality of openings fits onto the front of the drawer. A first device type includes a front bezel which fills one opening in the cover and is cooled by air passing through a number of holes located along the length of the lower surface of the frame. A second device type is cooled by air passing through a number of holes located along the length of the lower surface of the frame. A second device type is cooled by air passing through a louvred panel located in one opening in the cover. The panel includes a blanking member which blocks off the frame cooling holes located in front of the second device type. There is no air flow through the cooling holes. In addition, noise coming through the holes from inside the drawer is reduced.

U.S. Pat. No. 5,207,613 teaches a high density electronic module packaging system which includes a cabinet for housing a plurality of modules. Disposed at the rear of the cabinet and forming a rear wall thereof is a cooling system housing that is used for cooling the modules contained in the cabinet. Disposed within the cabinet are four cooling modules, a power distribution unit having twelve power converters and twenty-eight electronic modules. The number of cooling modules, power converters and electronic modules may be added or subtracted as needed or desired. The cooling modules flow cooling fluid to and/or from the power distribution unit and/or to the plurality of electronic modules. The power distribution unit supplies power to the plurality of electronic modules. The electronic modules may house one or more submodules such as storage disk drives or printed circuit boards.

U.S. Pat. No. 5,379,184 teaches a multi-module storage array which includes cabinets. Each cabinet has a number of identical bays for receiving any of a set of replaceable, modular push-in/pull-out articles each to be inserted into any bay, each including a carry-handle having an outer bar joining a pair of arms pivoted from opposite sides of the article so that the arm ends can be swung against a first stop to pry-in the article and can also be swung oppositely against a second stop to pry it out, with the handle also adapted to be automatically "kicked-out" horizontal and being held horizontal unit reset.

U.S. Pat. No. RE34,369 an adapter which is provided for a removable information storage device in an information storage and retrieval system or control system. There is a mounting bracket permanently installed in a half-height space and hooked up to the wires already provided for in the system. A separate box-like cartridge component permanently houses the information storage device. The cartridge has electrical connections for connecting the information storage device to a mateable connector mounted on the back face of the cartridge. The mounting bracket likewise has a complementary mateable connector mounted on it so that both connectors will plug together whenever the cartridge is fully inserted into the bracket. This completes the electrical connections and power supply between the information storage device and the system allowing the information storage device to be used as if it were permanently installed in the system. The walls of the cartridge and the bracket engage through a pair of tracks and guideways to align the cartridge as it is inserted in the bracket and to match up the mateable connectors.

U.S. Pat. No. 5,471,099 teaches a modular enclosure apparatus for personal computers and/or work stations which has a plurality of removable and replaceable modules. These modules include a cooling module for cooling the enclosure. A memory storage device module has a plurality of mating slides and carriers for routine installation and removal of each memory storage device and a power supply module for providing power to the enclosure. The modular enclosure apparatus includes a RAID controller module which is similarly removable and replaceable. Each module may include a circuit interrupt assembly for disabling individual modules by cutting off power to the desired module and allowing that module or parts contained therein to be removed while the power is disabled only to the module desired and the remaining modules continue to be enabled.

U.S. Pat. No. D308,052 teaches an ornamental design for a lockable and removable slide-in assembly for a hard disk drive.

U.S. Pat. No. 5,247,427 teaches a disk array subsystem which is for use in a data processing system. The disk array subsystem includes a generally rectangular chassis having a top wall, a bottom wall, a pair of side walls, an open front end and an open rear end. Disposed within the chassis are three power supplies, a pair of controller boards, a backplane and a set of twenty disk drive modules. A mounting structure includes four first disk drive module guide plates and a pair of second disk drive module guides is fixedly mounted within the chassis for removably mounting the disk drive modules in the chassis through the open front end and for placing the hard disk drives in approximate alignment with the backplane for electrical connection therewith. Each first guide plate is shaped to include five parallel slotted channels and each second disk drive module guide plate is shaped to include ten parallel grooves. Each of the twenty disk drive modules includes an elongated frame having a longitudinally extending T-bar adapted for slidable insertion into one of the slotted channels and a longitudinally extending fin adapted for slidable insertion into one of the grooves. The T-bar is shaped to include a detent and the slotted channel is shaped to include a pawl. The detent and the pawl is interengageable so as to permit the hard disk drive module to be secured in place on its associated slotted channel.

U.S. Pat. No. 5,604,662 teaches an expandable modular data storage system which includes a plurality of data storage devices, a plurality of substantially identical, vertically stackable storage device housings adapted to slidably receive a data storage device and mechanical connection elements for releasably connecting the top of one storage device housing to the bottom of a storage device housing stacked thereon.

U.S. Pat. No. 5,483,419 teaches a docking module for removable disk drives which provides space for two such disk drives within a standard half-height bay. The docking module provides cammed insertion and removal together with hot wappability of disk drives. The bay is provided within a housing member. A door is rotatably mounted on the housing member and configured to serve as a lever arm. An engagement portion for urging a disk drive into the bay protrudes from the door. A slide is mounted within the housing member and connected to the door such that rotation of the door causes the slide to move forward and back within the housing member. A tab on the inner end of the slide engages the disk drive to urge the disk drive out of the bay. Alternative embodiments provide ten or more disk drives at a density of two drives per half height bay.

U.S. Pat. No. 5,309,323 teaches a removable electrical unit which incorporates a soft stop and releasing mechanism which is employed to prevent removal of the unit from its housing in an unsafe manner. In operation, the unit is pulled from the housing by means of a front handle on the unit and when the unit is partially removed from its housing a stop block on the unit engages a stop spring on the housing. A second handle on the top of the unit becomes accessible and is actuated to disengage the stop block and stop spring. The unit may then be completely removed from the housing in a safe two handed manner.

U.S. Pat. No. 5,224,020 teaches a modular electrical apparatus which includes a plurality of customer removable electrical devices inserted in one end of a drawer type tubular chassis and various field replaceable support units mounted at the other end of the chassis. The devices and support units are all blind pluggable into a removable central electrical distribution unit which includes complementary connectors on opposite sides and a set of electrical conductors for connecting the devices and units. Internal electrical connection of all the units in the drawer is via the electrical distribution unit and external electrical connection is made only to the outer end of the support units. Cooling fans for inducing an air flow through the tubular chassis to cool the devices and support units are mounted in the central electrical distribution unit. All the components can be removed for repair or replacement from either the front or rear entrance of the tubular chassis.

U.S. Pat. No. 5,006,959 teaches modular elements of a control system in which units are arranged in a single integrated array, with plug-in units packaged in like modules, and cooled in common, along with a motherboard.

The inventor hereby incorporates all of the above referenced patents into this specification.

SUMMARY OF INVENTION

The present invention is generally directed to a canister and a casing of a computer peripheral enclosure. The casing has at least one compartment. Each compartment is rectangular and has a cross-sectional area and a depth. Each compartment also has two guide rail mounts. The canister includes a u-shaped tray which is rectangular and has a cross-sectional area and a depth. The canister has two guide rails. The cross-sectional area and the depth of the canister are slightly less than the cross-sectional area and the depth of each compartment.

In a first separate aspect of the present invention the u-shaped tray also has two side walls and a two return lips so that the u-shaped tray is able to slide freely, but snugly, into the compartment of the casing. Each guide rail is mechanically coupled to one of the side walls of the u-shaped tray walls. The guide rails of each u-shaped tray slides freely, but snugly, into one of the compartments on the guide rail mounts thereof.

In a second separate aspect of the present invention the canister includes a front plate and a handle. The front plate is mechanically coupled to the u-shaped tray. The handle couples each u-shaped tray to one of the compartments.

In a third separate aspect of the present invention the canister includes a lock. The lock locks the handle to the front plate.

In a fourth separate aspect of the present invention the canister includes a light pipe system which has a light pipe and a special lens.

In a fifth separate aspect of the present invention the canister includes a combination rail guide and light pipe system.

In a sixth separate aspect of the present invention the canister includes a ventilation system in which the handle, the front plate, the side walls of the u-shaped tray have a pattern of holes.

In a seventh separate aspect of the present invention the canister includes an electromagnetic interference grounding system which includes flat springs which mechanically and electrically couple each u-shaped tray to one of the compartments of the casing.

In an eighth separate aspect of the present invention the handle of the canister includes a cam mechanism.

In a ninth separate aspect of the present invention the handle of the canister includes a cam mechanism and a lock.

In a tenth separate aspect of the invention a computer peripheral enclosure includes a casing having compartments and canisters. Each canister is freely, but snugly, slidable into one of the compartments of the casing.

In an eleventh separate aspect of the invention a computer peripheral enclosure includes a casing and a canister containing a power supply. The canister is placed in one of compartments of the casing so that the power supply is removable.

In a twelfth separate aspect of the invention the handle of the canister includes a cam mechanism and a lock so that neither installation into nor removal of the canister from the casing of the computer peripheral enclosure can occur once the lock has been engaged.

In a thirteenth separate aspect of the invention the midplane of the casing has a hole pattern the design of which directs a balanced airflow all around the casing.

In a fourteenth separate aspect of the invention controllers in the casing can be networked by a side riser card and four PCI cards. The PCI card include computer cards, network cards, RAID controller cards, memory cards, any other standard PCI cards and any permutation and combination thereof.

In a fifteenth separate aspect of the invention a personality card is connected to the midplane with a riser card which provides either up to two redundant controllers or one redundant controller and one network attached controller which can be networked by a side riser and four PCI cards. The controllers are removable.

In a sixteenth separate aspect of the invention a rail assembly takes up a minimum of space in a cabinet. The rail assembly is used to install a rack-mountable bay into the cabinet.

Other aspects and many of the attendant advantages will be more readily appreciated as the same becomes better understood by reference to the following detailed description.

The features of the present invention which are believed to be novel are set forth with particularity in the appended claims.

DESCRIPTION OF DRAWINGS

FIG. 9 is a schematic drawing of the light pipe system of the canister of FIG. 1

FIG. 10 is a partial schematic drawing of the light pipe system of FIG. 9.

FIG. 14 is a partial top plan view of the canister of FIG. 11.

FIG. 15 is a partial bottom plan view of the canister of FIG. 11.

FIG. 16 is a perspective view of the storage device of U.S. Pat. No. 5,822,184 which is a hard disk drive.

FIG. 21 is a perspective drawing of an eight storage device peripheral enclosure with ten canisters which have eight storage devices and two front-removable power supplies.

FIG. 22 is a rear elevation view of the eight storage device peripheral enclosure of FIG. 21.

FIG. 23 is a perspective drawing of a ten storage device peripheral enclosure with ten canisters which have ten storage devices.

FIG. 24 is a rear elevation view of the ten storage device peripheral enclosure of FIG. 23.

FIG. 25 is a perspective drawing of a twenty storage device peripheral enclosure with twenty canister which have twenty storage devices.

FIG. 26 is a front perspective drawing of a rack-mountable, ten storage device peripheral enclosure.

FIG. 27 is a rear elevation view of the rack-mountable, ten storage device peripheral enclosure of FIG. 26.

DESCRIPTION OF THE PREFERRED EMBODIMENT

Figure 1:
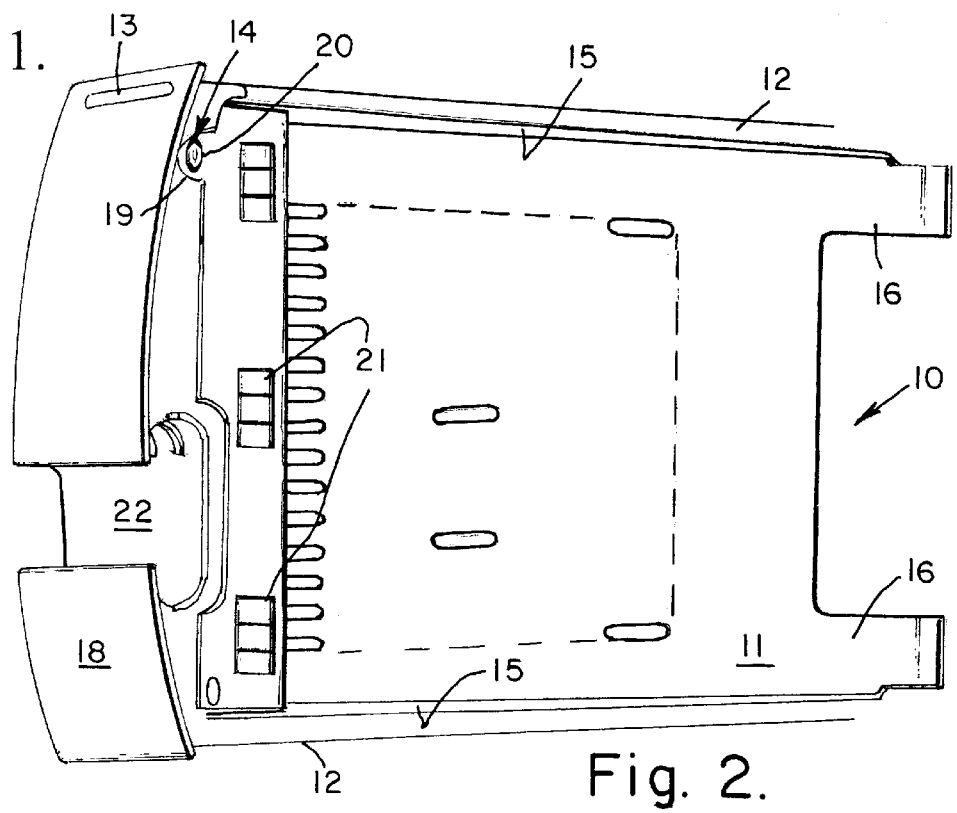
FIG. 1 is a perspective view of a canister which has a combined guide rail and light pipe system and a cam mechanism according to the first embodiment.
Figure 2:
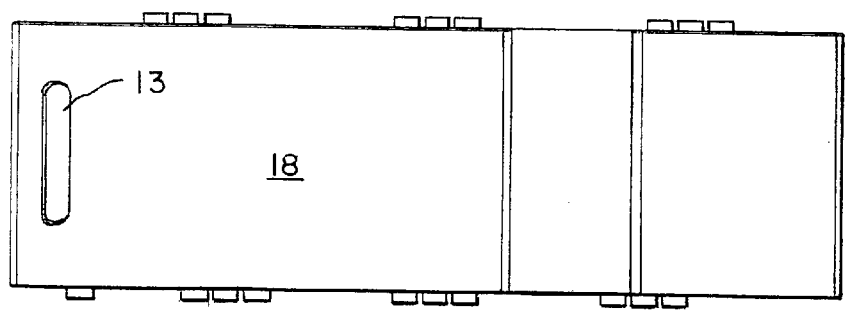
FIG. 2 is a front plan view of the canister of FIG. 1.
Figure 3:
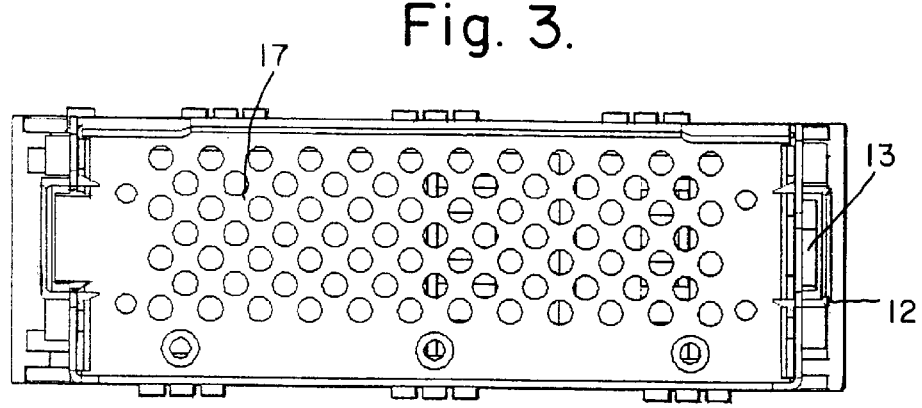
FIG. 3 is a rear plan view of the canister of FIG. 1.

Referring to FIG. 1 and FIG. 1a in conjunction with FIG. 2, FIG. 2a and FIG. 3 a canister 10 includes a u-shaped tray 11 and two guide rails 12. The u-shaped tray 11 has a rectangular cross-section and a depth. The canister 10 also includes a light pipe system 13 and a cam mechanism 14. The unshaped tray 11 has two side walls 15 and two return lips 16. The canister 10 includes a front plate 17 and a handle 18. The front plate 17 is mechanically coupled to the u-shaped tray 11.

Figure 4:
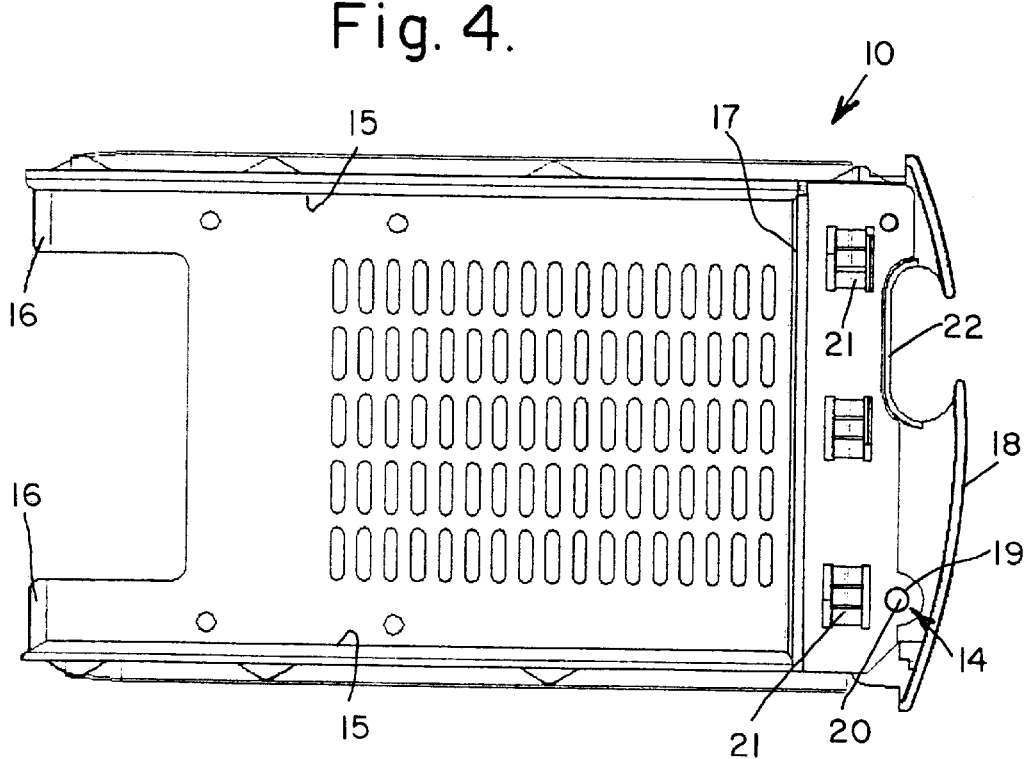
FIG. 4 is a top plan view of the canister of FIG. 1.
Figure 5:
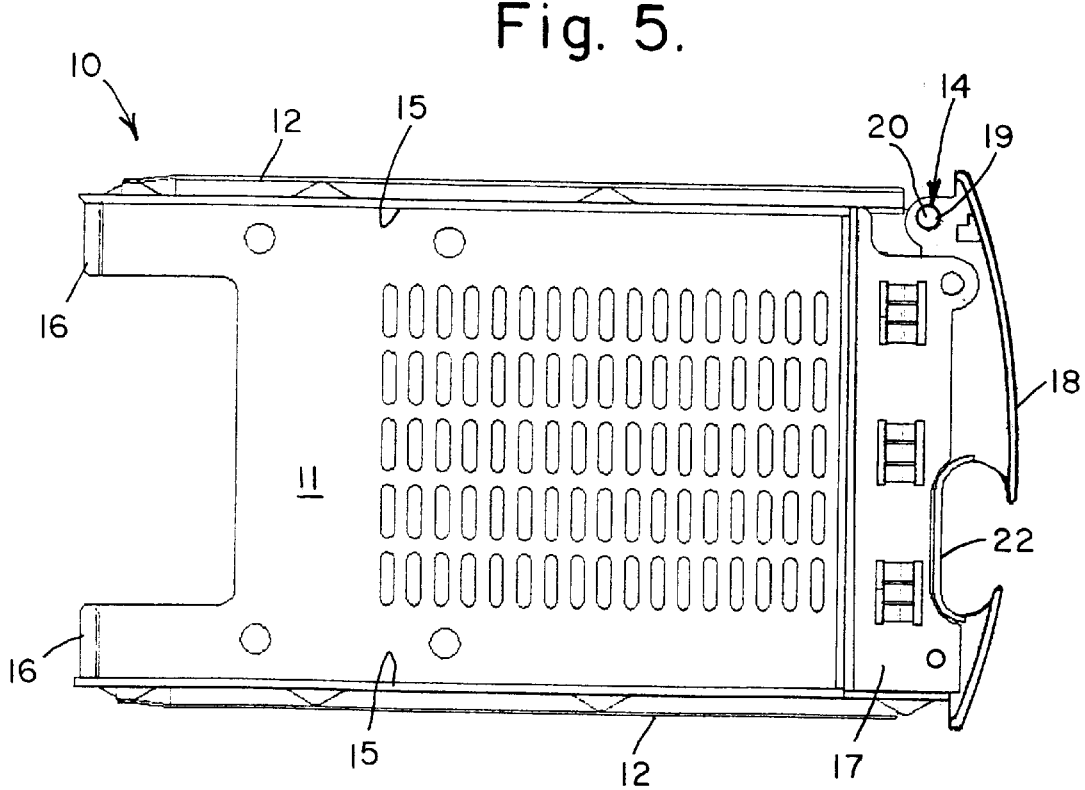
FIG. 5 is a bottom plan view of the canister of FIG. 1.

Referring to FIG. 4 in conjunction with FIG. 1, FIG. 1a, FIG. 2a and FIG. 5 each guide rail 12 is mechanically coupled to one of the two side walls 15 of the unshaped tray 11. The cam mechanism 14 has a pivot mount 19 and a pin 20. The pivot mount 19 mechanically couples the handle 18 to the u-shaped tray 11. The two lips 16 are adjacent to the bottom surface of the unshaped tray 11 at its rear end. The u-shaped also has a plurality of flat springs 21 which are disposed on the top outside surface and the bottom outside surface of the canister 10. The handle 18 has a plastic insert 22 which is used for a commercial designation of a customer. The customer may choose the color and texture of the plastic insert 22.

Figure 6:
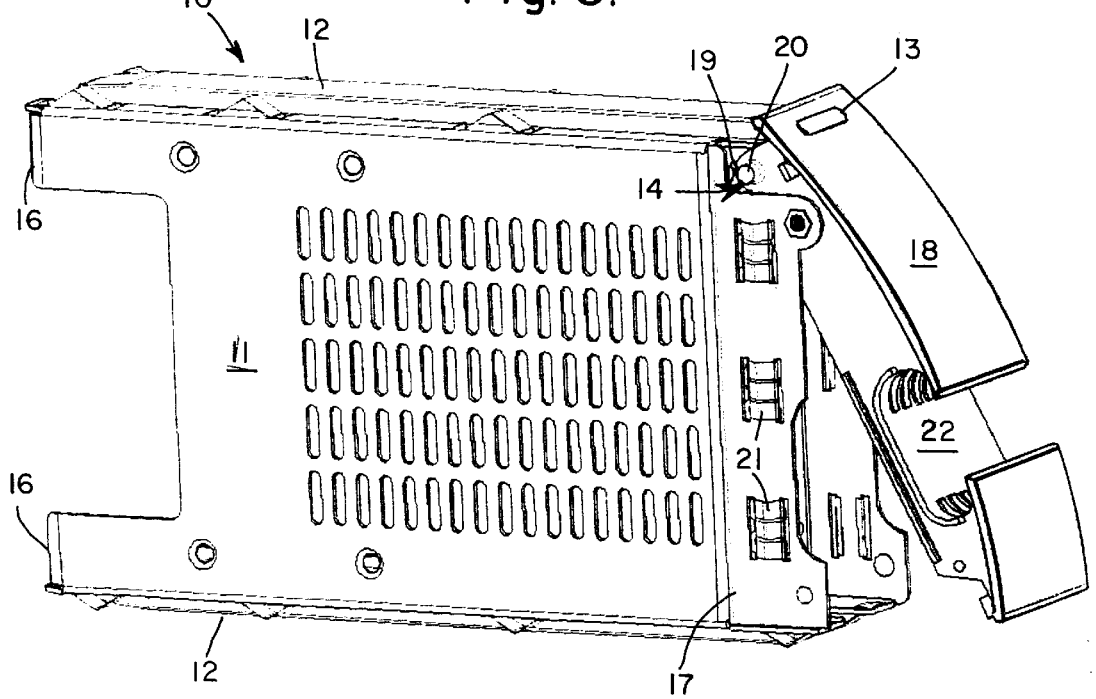
FIG. 6 is a schematic drawing of the canister of FIG. 1 as the canister is being inserted into one of the compartments of a casing.

Referring to FIG. 6 in conjunction with FIG. 1 a computer peripheral enclosure has a casing 110. The casing 110 has a plurality of compartments 111, two guide rail tracks 112, a slot 113 and a midplane 114. Each compartment 111 is rectangular and has a cross-sectional area and a depth. The compartment 111 also has two rail guide tracks 112. The cross-sectional area and the depth of the u-shaped tray 11 are slightly less than the cross-sectional area and the depth of the compartment 111, respectively so that the u-shaped tray 11 of each canister 10 is able to slide freely, but snugly, into one of the compartments 111 of the casing 110. The guide rails 12 of the u-shaped tray 11 slide freely, but snugly, onto the rail guide tracks 112 of the compartment 111. The two lips 20 of the unshaped tray 11 assist the user as he inserts the unshaped tray 11 of each canister 10 into one of the compartments 111 of the casing 110. The flat springs 21 electrically couple each canister 10 to one of the compartments 111 of the casing 110 in order to either eliminate or reduce electromagnetic interference. The handle 17 either inserts or removes the canister 10 from the casing 110 of the peripheral enclosure with just enough either insertion force or removal force to ensure that a storage device is either connected or disconnected and that its connectors are not damaged.

Figure 7:
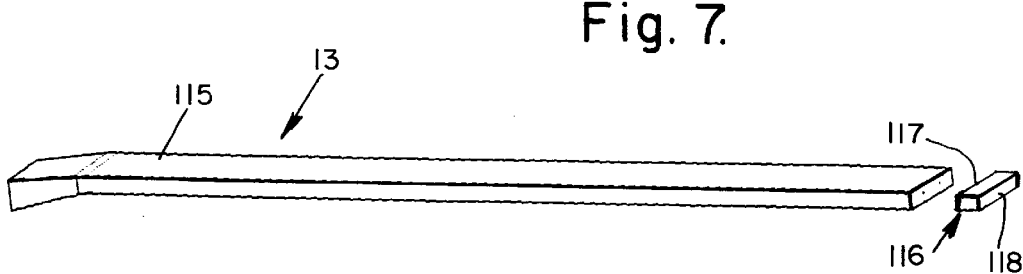
FIG. 7 is a perspective drawing of a plastic light carrier of the combined guide-rail-light pipe system of the canister of FIG. 1.
Figure 8:
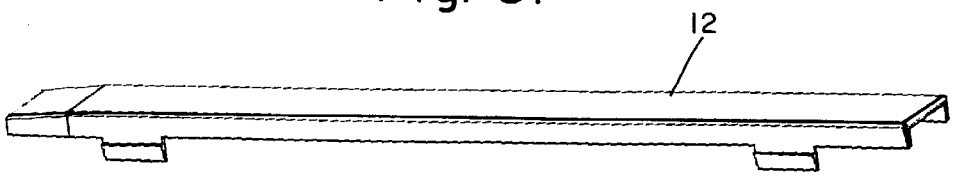
FIG. 8 is a perspective drawing of a guide rail of the combined guide rail and light pipe system of the canister of FIG. 1.

Referring to FIG. 7 in conjunction with FIG. 8 the light pipe system 13 includes a light pipe 115 and a special lens 116. The light pipe 115 has an input end and an output end. The area of the input end is larger than the area of the output end. The special lens 116 has a first light diffuser 117 on a first surface and a second light diffuser 118 on a second surface. The first and second light diffusers 117 and 118 are formed by frosting the first and second surface of the special lens 116. The special lens 116 is mechanically coupled to handle 18. The light pipe 115 has a protrusion 119 which engages an indent 120 in the side wall 15 of the unshaped tray 11 in order to properly align the light pipe 115.

Referring to FIG. 9 in conjunction with FIG. 10 the light pipe 115 and the special lens 116 are optically coupled to two light emitting diodes 121 and 122. One light emitting diode 121 emits a red light and the other light emitting diode 122 emits a blue light. When the red and blue lights are mixed the resulting mixture of light is a purple light. The light emitting diodes 121 and 122 are mounted onto the midplane 114. The light from each set of two light emitting diodes 119 and 120 travels through the air and into the light pipe 115 of one of the canisters 10. The light pipe 115 is mounted within one of the guide rails 12 to form a combined guide rail and light pipe system 119. The combined guide rail and light pipe system 119 is mounted on one of the two side walls 15 of the unshaped tray 11.

Figure 11:
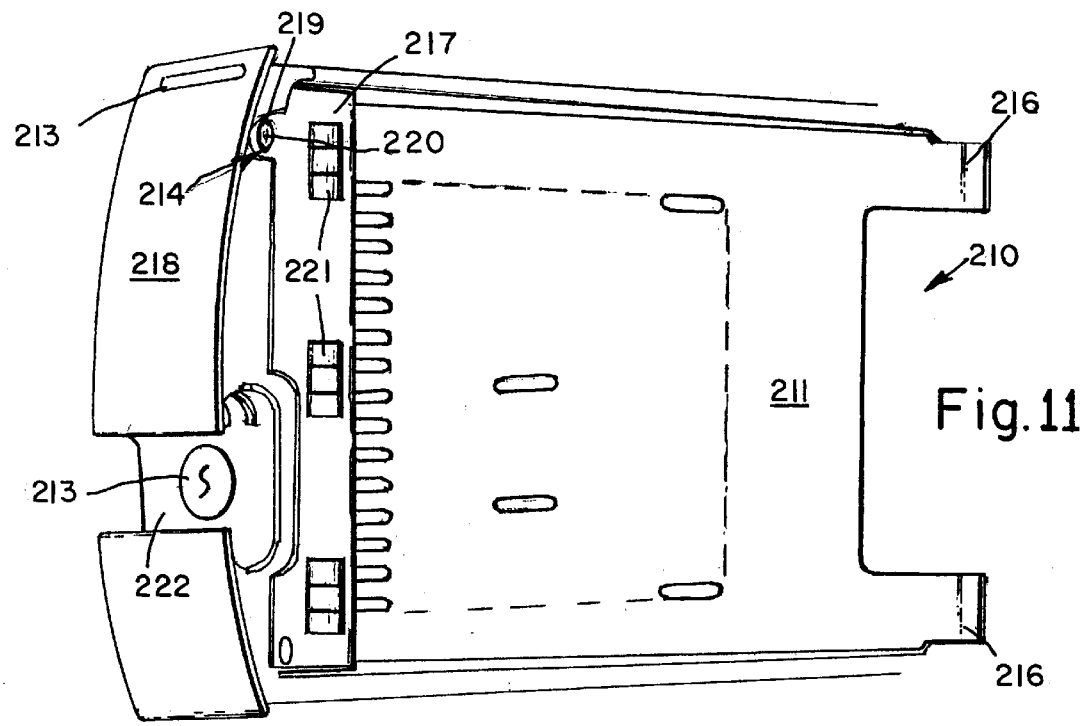
FIG. 11 is a perspective view of a canister which has a combined lock-cam mechanism and light pipe system according to the second embodiment.
Figure 12:
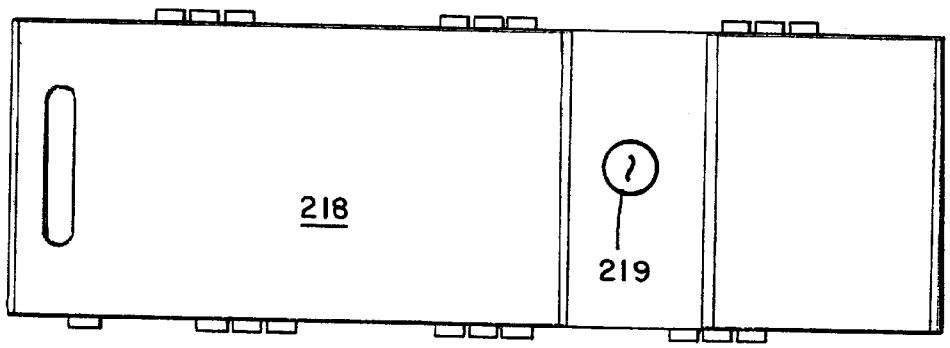
FIG. 12 is a front plan view of the canister of FIG. 11.
Figure 13:
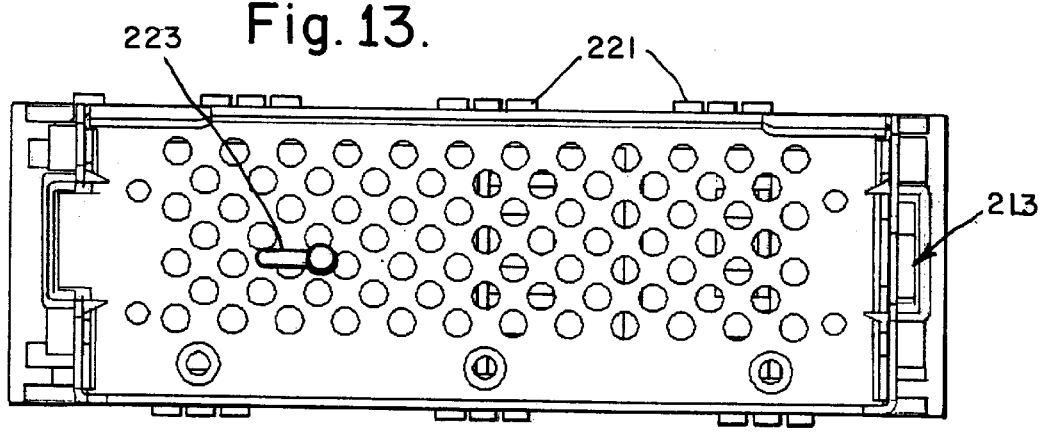
FIG. 13 is a rear plan view of the canister of FIG. 11.
Figure 17:
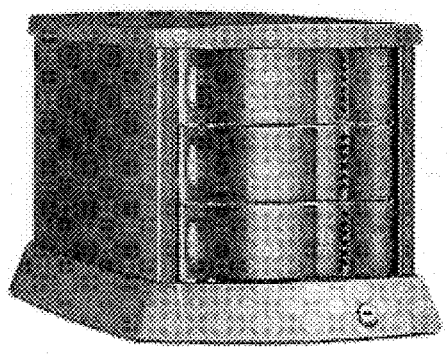
FIG. 17 is a perspective drawing of a two storage device casing with three canisters which have two storage devices and one front removable power supply.
Figure 18:
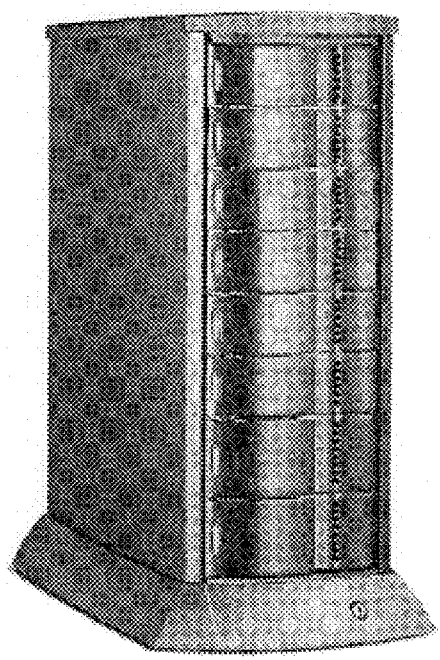
FIG. 18 is a perspective drawing of a six storage device casing with eight canisters which have six storage devices and two front-removable power supplies.
Figure 19:
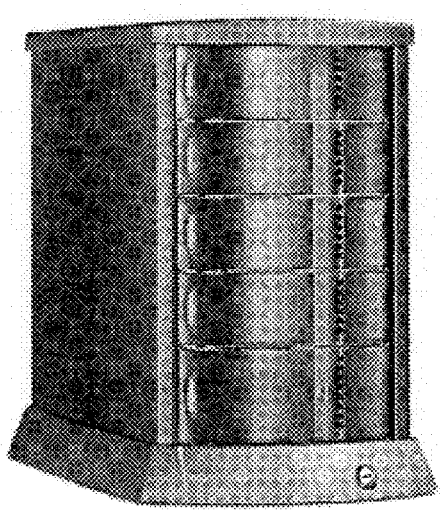
FIG. 19 is a perspective drawing of a four storage device peripheral enclosure with five canister which has four storage devices and one front-removable power supply.
Figure 20:
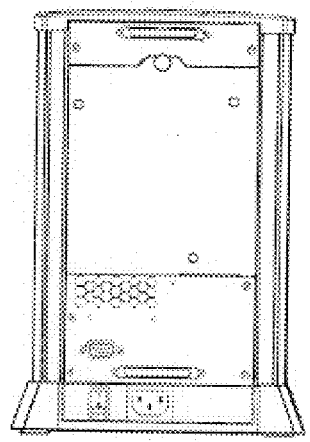
FIG. 20 is a rear elevation view of the four storage device peripheral enclosure of FIG. 19.
Figure 28:
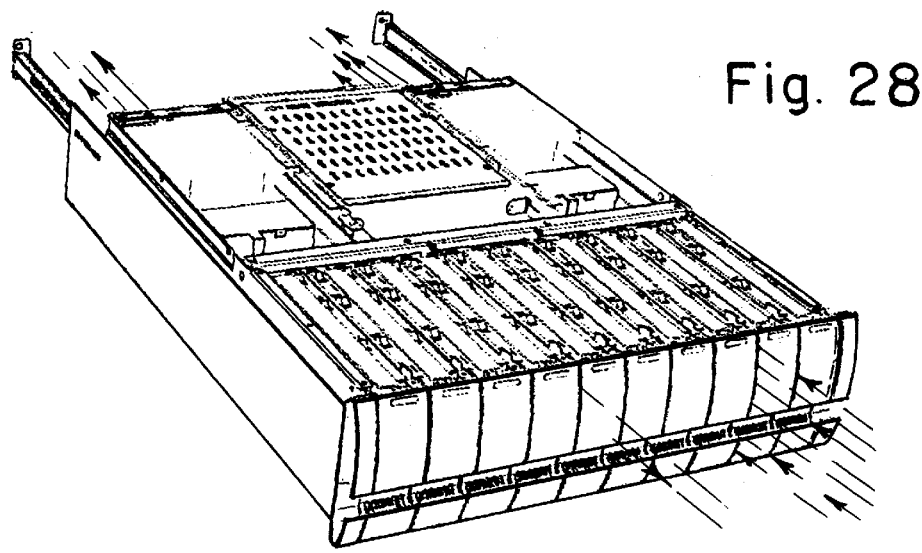
FIG. 28 is a front exploded view of the rack-mountable, storage device peripheral enclosure of FIG. 26.
Figure 29:
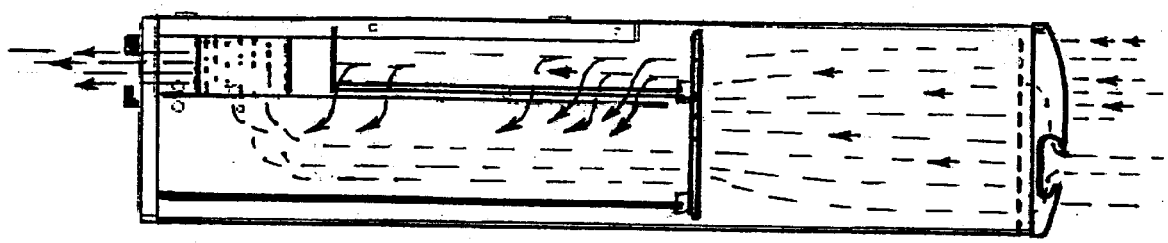
FIG. 29 is a front exploded view of the rack-mountable, ten storage device peripheral enclosure of FIG. 26.
Figure 30:
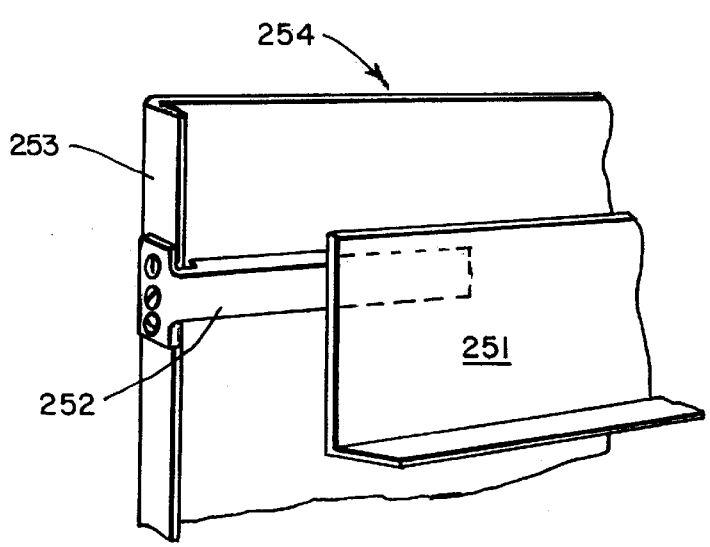
FIG. 30 is a first rear exploded vies of the rack-mountable, ten storage device peripheral enclosure of FIG. 26.
Figure 31:
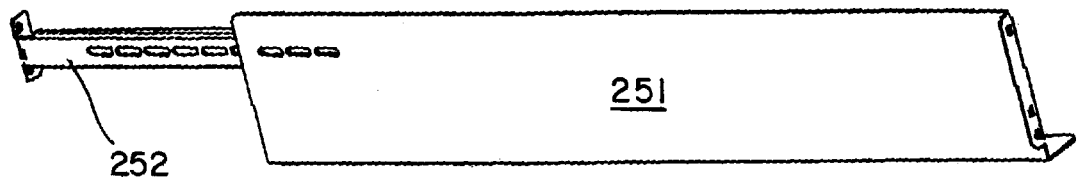
FIG. 31 is a second rear exploded view of the rack-mountable, ten storage device peripheral enclosure of FIG. 26.
Figure 32:
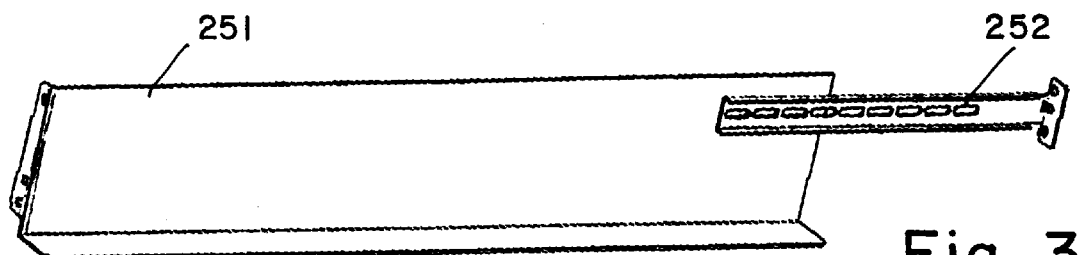
FIG. 32 is a rear exploded view of the rack-mountable, ten storage device peripheral enclosure of FIG. 26.

Referring to FIG. 11 in conjunction with FIG. 11a, FIG. 12 and FIG. 13 the canister 210 includes a u-shaped tray 211, two guide rails 212, a light pipe system 213 and a cam mechanism 214. The u-shaped tray 211 is rectangular and has a cross-sectional area and a depth. The unshaped tray 211 has two side walls 215 and two return lips 216. The canister 210 includes a front plate 217 and a handle 218. The front plate 217 is mechanically coupled to the u-shaped tray 211. The cam mechanism 214 has a pivot mount 219 and a pin 220. The pivot mount 219 mechanically couples the handle 218 to the u-shaped tray 211. The two lips 216 are adjacent to the bottom surface of the u-shaped tray 11 at its rear end. The u-shaped also has a plurality of flat springs 221 which are disposed on the top outside surface and the bottom outside surface of the canister 20. The handle 218 has a plastic insert 222 which is used for a commercial designation of a customer. The customer may choose the color and texture of the plastic insert 222.

Referring to FIG. 14 in conjunction with FIG. 11 and FIG. 15 the canister 210 further includes a lock 223. The lock 223 locks the handle 218 to the front plate 217 so that neither installation into nor removal of the canister 210 from the compartment 111 of the casing 110 of the computer peripheral enclosure can occur once the lock 223 has been engaged.

Referring to FIG. 16 a storage device, such as a hard disk drive, can be of any given configuration. The storage device is readily available in the commercial market and known in the art. The back of the standard storage device has drive-ready connectors. If the storage device is not drive-ready it can be converted with either a forty-pin or an eighty-pin high density drive ready connector to make the storage device RAID ready. Other types of connectors can be used depending upon design requirements.

Referring to FIG. 17 through FIG. 32 peripheral enclosures use the technology of this patent application. There are several different configurations: two through twenty drive-bay tower enclosures and ten through sixteen drive-bay rack-mountable enclosures. These enclosures are built to house all types of computer peripheral equipment including DAT drives, storage devices, optical drives, CD-ROM drives, DVD drives, any tape drive, any type storage devices and network attached storage servers along with up to two RAID controllers. The RAID controllers are fault-tolerant storage management devices. The connections on the SCSI units are for eighty-pin SCA drives, but there are boards which work for other interfaces. A fiber channel unit uses forty-pin connections. Configurations vary depending on the scalability requirements of the user. The rack-mountable bay casing 110 can hold either up to ten 3.5" HH or up to sixteen 3.5" LP storage devices.

Figure 33:
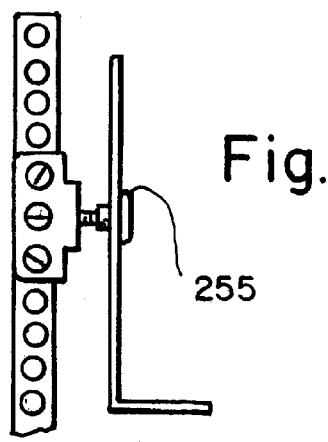
FIG. 33 is a partial perspective view of a rail assembly for a rack-mountable, ten storage device peripheral enclosure.

Referring to FIG. 33 a rail assembly 251 for the rack-mountable bay casing 110 includes two L-shaped members 251.

Figure 34:
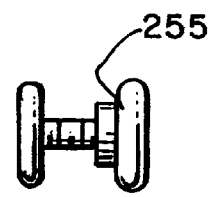
FIG. 34 is a partial outside, elevation side view of the rail assembly of FIG. 33 for a rack-mountable, ten storage device peripheral enclosure.
Figure 35:
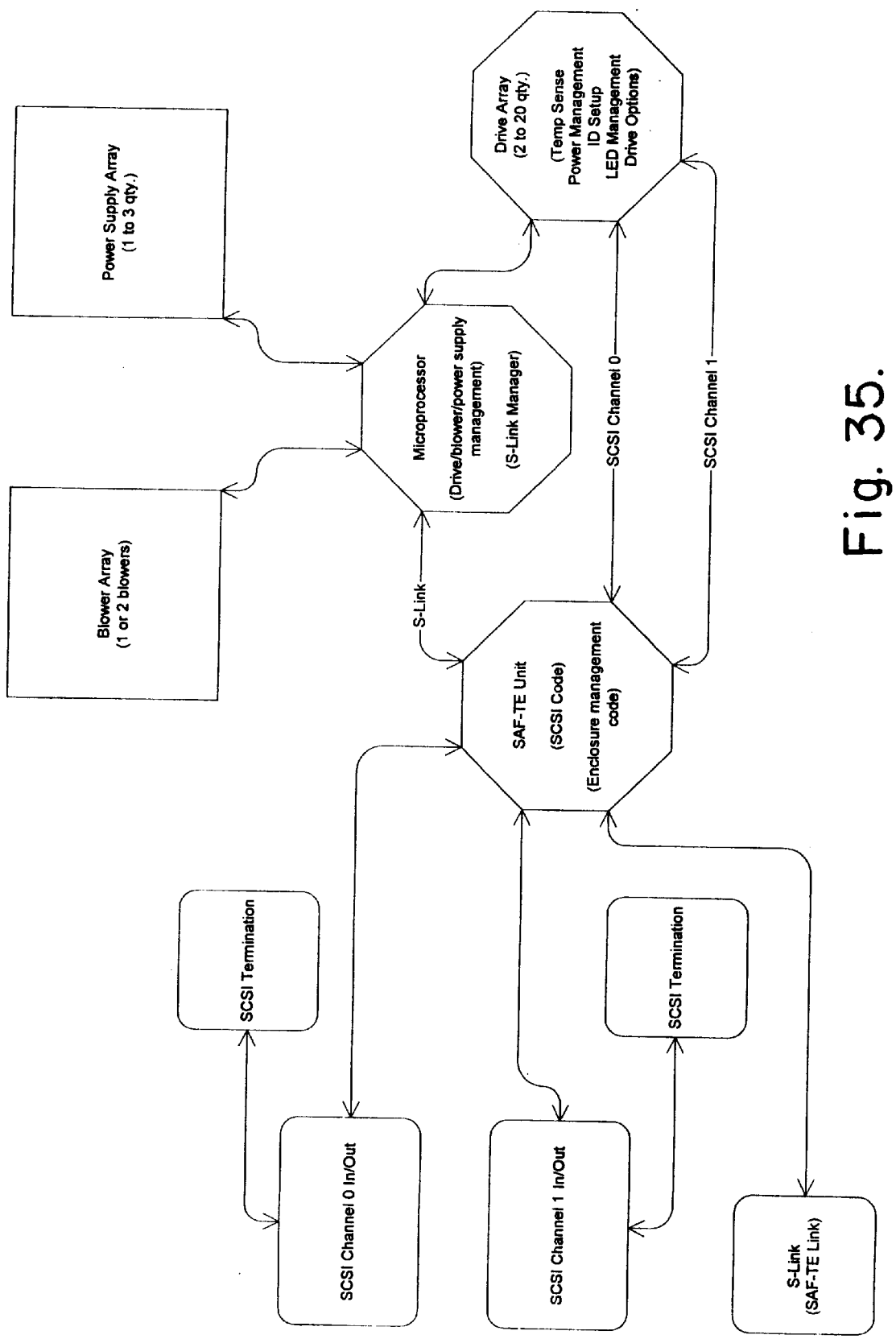
FIG. 35 is a partial inside, elevation side view of the rail assembly of FIG. 33 for a rack-mountable, ten storage device peripheral enclosure.

Referring to FIG. 34 in conjunction with FIG. 33 and FIG. 35 the rail assembly also includes two extension members 252. There can be more than one power supply, multiple blowers, device canisters and controller bays available. If any one of the components fail, the other one will continue to adequately run the peripheral enclosure. If a power supply fails there is at least one power supply still left. The remaining power supply will provide enough power to run the peripheral enclosure. Additionally, these modular components are also hot-swappable which means that the unit does not have to be shut down to replace the component. In the peripheral enclosure of a power supply that has failed it is simply replaced with a new one while the peripheral enclosure continues to run uninterrupted. The special connectors which are used on the power supplies have specially designed pins which are staggered and allow hot-swapping. If the user decides to install two controllers, they can be setup in a fault-tolerant configuration. Such a configuration provides that if one of the controllers fails, the other one will continue to work without causing system downtime. The special connectors which are used on the midplane allow the failed controller to be replaced while the system continues to function.

If the user decides that he wants to be able to monitor the enclosure from a remote location, the user can add a SAF-TE/SES to the personality card. This is compliant to an industry standard. The design of the peripheral enclosure has expanded on this industry standard and has added many vendor unique upgrades to its product. The design of the peripheral enclosure also implements a proprietary serial-based interface in order to communicate with this SAF-TE/SES located on the midplane. This is called either an 'S-link' or an SAF-TE/SES link. It is a serial communications connection using a connector. Every peripheral enclosure which is part of the series and which is of this invention has a S-Link connector on it. This allows the user to install a SAF-TE/SES into one peripheral enclosure and connect it to another peripheral enclosure using the S-Link to connect the other peripheral enclosure to the SAF-TE/SES. This way, the user can monitor all of the peripheral enclosures in his system using just one SAF-TE/SES.

The ten bay rack-mountable peripheral enclosure fits into an industry-standard 19" cabinet space in a 3U form factor. The peripheral enclosure has a special two piece mounting tray which incorporates simplified integrating hardware. The technology of the midplane allows a number of storage devices, controllers, power supplies (N+1, redundant), blowers (N+1, redundant) and SAF-TE/SES to be all within this small amount of space. The peripheral enclosure also allows all major components to be removable and hot-swappable so that the system is not compromised if one of these components fails. Without using this midplane design the smallest, similarly featured enclosure which can be created would be 5U high. Power supplies and fans would be in the back of the unit and the two controllers and ten storage devices would be in the front.

A large number of devices and controllers can fit into this 3U space including two controllers and ten storage devices. In any other enclosures of the prior art, the controllers and the storage devices would be placed into separate chassis. A controller chassis is typically 4U and a drive chassis is typically 3U and usually holds either eight or nine devices at the most. The casing 110 holds ten storage devices. The same amount of devices or more may fit into the casing 110 than in a 7U enclosure of the prior art which requires 3U's for storage devices and 4U's for controller enclosure. Even the most compact systems of the prior art which combine controllers and drives into the same peripheral enclosure can be no smaller than 3U inches. The peripheral enclosure of the prior art can not come close to the casing 110 in performance or reduced points of failure because they have cabling and normally several different boards to make all of the connections to all devices.

The casing complies with agency standards such as UL, CSA/TUV, C-Tick and CE. A conversion kit allows a rack-mountable peripheral enclosure to be made into either tower by adding on a plastic bottom and a side shell thereby turning it into a permanent tower peripheral enclosure. This universality to the peripheral enclosure allows out the users to choose their migration pattern.

These peripheral enclosures are configured in a RAID setup which is a Redundant Array of Independent Disks. If any one of the storage devices fails, the missing data can be recalculated by the other two or more that are remaining.

These peripheral enclosures also offer many features that allow data to remain online and accessible such as hot-swap blowers, N+1 hot-swappable fans and hot-swappable removable canisters. These features allow the highest data availability possible and are meant to keep data accessible even if a failure does occur. Depending on the RAID configuration used if an entire subsystem enclosure fails completely, the other remaining subsystem enclosures will be able to calculate and rebuild the data which was on the failed subsystem enclosure peripheral enclosure so that no system data loss will occur.

In order to prevent a unit failure while operating, the power supply pins are designed in such a way that when either removing or installing the power supply the system is not disrupted. This is done by connecting a zero voltage line and an option line first, then connecting the interface lines and finally connecting the DC power lines. This provides a safe means of power supply replacement while the unit continues to operate. The output connector on the power supply has three different length pins for staggered engagement when hot swapping. Only two lengths were needed for the power supply but the connector was selected because of its availability. Pin 19, DC Enable, (for example), must engage last so that the all outputs are connected before enabling the output.

Controllers in the casings can be networked by a side riser card and four PCI cards. The PCI card is either a computer card plus three cards or a personality card and four PCI cards.

From the foregoing it can be seen that a peripheral enclosure, which includes a plurality of canisters for storage devices and a casing, has been described.

Accordingly it is intended that the foregoing disclosure be considered only as an illustration of the principle of the present invention

What is claimed is:

1. A canister for use with a storage device and a casing of a computer peripheral enclosure with the casing having at least one compartment each of which has a rectangular cross-section and a depth and each of which also has two guide rail guides, said canister comprising:

a. a u-shaped tray having a rectangular cross-section and a depth which are slightly less than the rectangular cross-section and the depth of said compartment, respectively, and also having a pair of side walls whereby said u-shaped tray is able to slide freely, but snugly, into said compartment of said casing;

b. a pair of guide rails each of which is mechanically coupled to said side walls of said u-shaped tray walls whereby said guide rails of said unshaped tray slides freely, but snugly, into said compartment on the guide rail guides;

c. a light pipe system having a light pipe mechanically coupled to said side wall and a lens mechanically coupled to said u-shaped tray.

2. A canister according to claim 1 wherein said canister includes a front plate mechanically coupled to said u-shaped tray and a handle which mechanically couples said u-shaped tray to said compartment wherein said lens is mechanically coupled to said handle.

3. A canister according to claim 2 wherein said canister includes a lock which locks said coupler to said front plate.

4. A canister according to claim 3 wherein said canister includes an electromagnetic interference grounding system whereby each of said u-shaped trays has a plurality of springs which mechanically and electrically coupled it to one of the compartments of the casing.

5. A canister according to claim 3 wherein said canister includes a combination rail guide and light pipe system in which one of said guide rails encloses said light pipe.

6. A canister according to claim 3 wherein said canister includes a ventilation system wherein said handle, said front plate, said side walls of said u-shaped tray have a pattern of holes which allow air to pulled in by a blower whereby the storage devices are cooled.

7. A computer peripheral enclosure comprising:
   a. a casing having a plurality of compartments each of which having a rectangular cross-section and a depth;
   b. a plurality of canisters each of which has a side wall, with each of said canisters being freely, but snugly, slidable into one of said compartments of said casing; and
   c. a light pipe system having a plurality of light pipes and a plurality of lenses, each light pipe mechanically coupled to said side wall of one of said canisters and each of said lenses being mechanically coupled to said canisters.

8. A computer peripheral enclosure according to claim 7 wherein said casing has a plurality of compartments each of which has a rectangular cross-section and a depth and each of which also has two guide rail guides and wherein each of said computer peripheral device holders is a canister which includes a u-shaped tray having a rectangular cross-section and a depth which are slightly less than the rectangular cross-section and the depth of said compartment, respectively, and also having a pair of side walls whereby said u-shaped tray is able to slide freely, but snugly, into said compartment of said casing; and a pair of guide rails each of which is mechanically coupled to said side walls of said u-shaped tray walls whereby said guide rails of said u-shaped tray slides freely, but snugly, into said compartment on the guide rail guides.

9. A canister according to claim 8 wherein said canister includes a front plate mechanically coupled to said u-shaped tray and a handle which mechanically couples said u-shaped tray to said compartment.

10. A canister according to claim 9 wherein said canister includes a lock which locks said handle to said front plate.

11. A canister according to claim 10 wherein said canister includes a light pipe system having a light pipe mechanically coupled to said side wall and a lens mechanically coupled to said handle.

12. A computer peripheral enclosure for receiving a number of computer peripheral devices to be plugged into and removed from interconnecting circuits, said computer peripheral enclosure comprising:
   a. a casing having a front cage and a rear cage, each having a rectangular outline and open front and rear sides relative to an insertion axis;
   b. a back-plane having front and rear faces and being mounted vertically between the rear of the front cage and the front of the rear cage and including multi-pin connectors disposed on the front and rear faces and a plurality of light emitting diodes mechanically coupled to said back-plane; and
   c. a plurality of computer peripheral device holder each of which is insertable through the front of the front cage into engagement with said multi-pin connectors on the front face of the back-plane each of said computer peripheral devices holders having two rail guides;
   d. a plurality of light pipes each of which is disposed in one of said rail guide of one of said computer peripheral device holders and each of which is optically coupled to one of said light emitting diodes to form a plurality of light pipe system.

13. A computer peripheral enclosure according to claim 12 wherein a plurality of support modules insertable through the rear opening of the rear enclosure into engagement with the connectors on the rear face of the back-plane wherein the support modules which includes a pair of redundant power-supply sub-modules, each having an internal fan and sufficient power supply capability to provide all needed power, the power supply modules including rear faces closing off the open rear side of the back enclosure when the sub-modules are plugged in, and the support modules also include a fan sub-module and a battery compartment including a backup battery and wherein said computer peripheral enclosure includes a panel closing the rear face of the battery compartment, and connectors on the panel.

* * * * *